O. B. LATHAM.

Packers for Oil-Wells.

No. 8,573. Reissued Feb. 11, 1879.

Attest
J K Smith
L. C. Fitler.

Inventor.
Obadiah B. Latham
by Bakewell & Kerr
Attorneys

UNITED STATES PATENT OFFICE

OBADIAH B. LATHAM, OF SENECA FALLS, NEW YORK.

IMPROVEMENT IN PACKERS FOR OIL-WELLS.

Specification forming part of Letters Patent No. 56,234, dated July 10, 1866; Reissue No. 8,573, dated February 11, 1879; application filed January 9, 1879.

DIVISION A.

*To all whom it may concern:*

Be it known that I, OBADIAH B. LATHAM, of Seneca Falls, in the county of Seneca and State of New York, have invented a new and useful Improvement in Packers for Oil-Wells; and I do hereby declare the following to be a full, clear, and exact description thereof, reference being had to the accompanying drawings, making part of this specification, in which—

Figure 1:
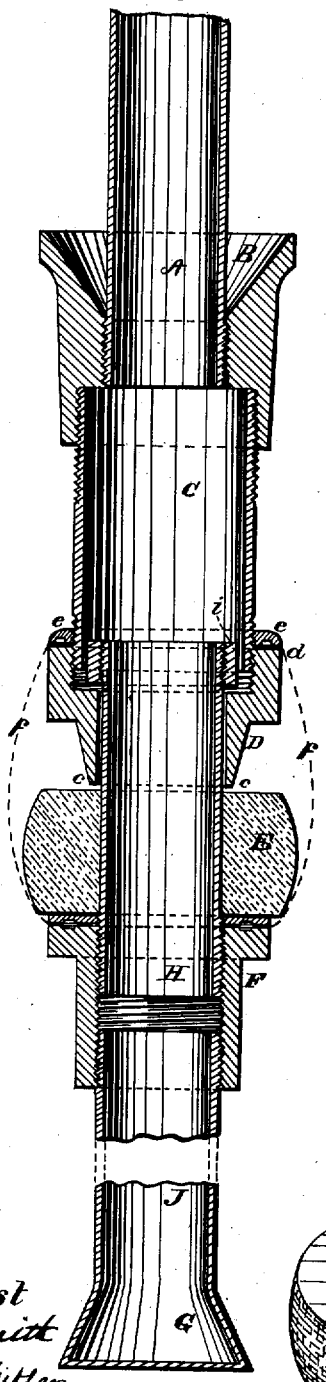
Figure 2:
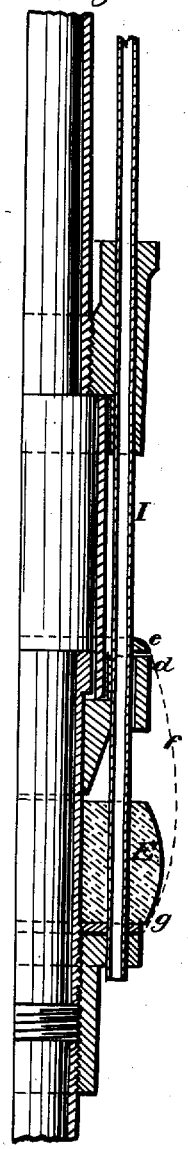
Figure 3:
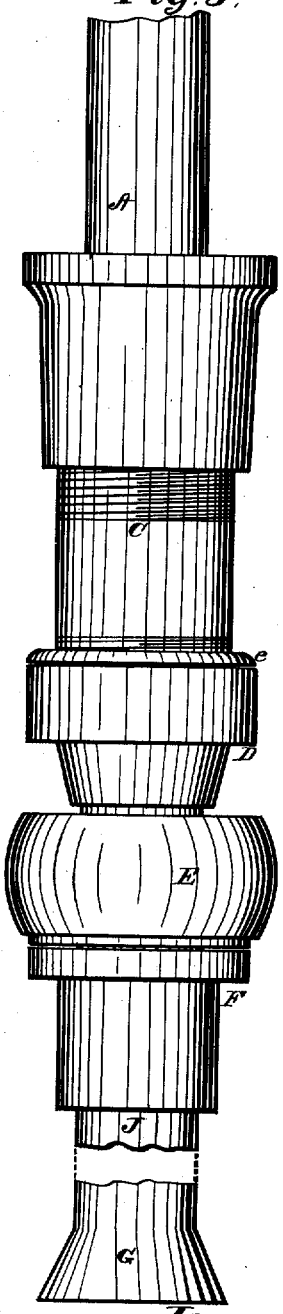
Figure 4:
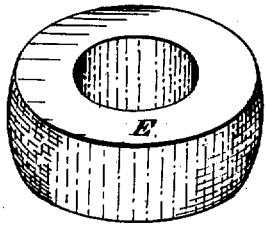

Figures 1 and 2 are vertical sections. Fig. 3 is an elevation, and Fig. 4 is a view of the solid elastic annulus or packing-ring.

Like letters of reference indicate like parts in each.

My invention relates to annular elastic packings; and consists in a thick, solid, elastic, centrally-expanded annulus as a packer for oil-wells, having a central opening of uniform diameter throughout, through which to pass the pump-tube, and an external diameter nearly equal to the diameter of the well, substantially as hereinafter described.

In order that others skilled in the art may understand my invention, I will describe the example illustrated by the drawings.

The main pump-tube A extends from the top of the well down to the funnel-shaped socket B, which has a diameter nearly equal to that of the well, and is designed to catch any débris which may fall into the well.

The socket B is screwed to a short cylinder, C, which is of slightly elliptic form in cross-section.

Screwed upon the lower end of the cylinder C is a hollow truncated cone, D, the lower edge of which is made blunt, so as to form a shoulder, for the purpose of preventing the elastic annulus sliding up on the cone while the apparatus is being lowered into the well.

Extending down from within the lower end of the cylinder C is the pump-tube H, which is loosely secured therein by the collar *i*. This collar is screwed on the upper end of the tube H, placed within the cylinder, and there retained by the cone D, which is screwed on afterward.

The collar *i* is slightly elliptical in cross-section to conform to the shape of the cylinder C, so that when the tube H is fixed from turning the cylinder C is fixed also.

Mounted on and surrounding the tube H is a solid thick annulus or ring, E, of gutta-percha or other elastic or flexible material. Its inner diameter is great enough to permit of its being slipped over the tube, and its outer diameter a little less than that of the well, so that it may be raised or lowered freely therein, and yet be expanded against the walls. It is supported upon the tube in any desired position by the flange F, which is screwed thereon.

Below the flange F and secured to it is the "anchor" or bottom tube J, which may be of any desired length. This tube rests upon the bottom of the well and supports the tubing.

In this instance the lower end, G, is flattened to a chisel shape, which causes it to sink into the bottom, and so prevent the turning of the tube H, and, by reason of its elliptical shape, the cylinder C. This is useful in unscrewing the tube A for the purpose of removing débris from the funnel-coupling B.

When the apparatus is lowered to place the weight of the tubing presses the cone down upon and into the elastic annulus, and forces it tightly against the walls of the well, the whole weight of the tubing resting upon the top of the annulus and further compressing and expanding it.

Thus it will be seen that the elastic annulus E, being interposed between the flange F and the otherwise unsupported tubing above, receives the whole weight of the latter, and by this means is expanded to pack the well, and this is what is meant by the term "centrally expanded."

My improved packing has many advantages over prior packers. It is cheaper, more durable, very much simpler in construction, automatic in its operation, and can be easily removed. It can be put in and taken out of the well at once without the delay and trouble of adjusting parts to permit its insertion or removal.

What I claim as my invention, and desire to secure by Letters Patent, is—

A solid, thick, elastic, centrally-expanded annulus as a packer for oil-wells, having a central opening of uniform diameter throughout, through which to pass the pump-tube, and an external diameter nearly equal to the diameter of the well, substantially as described.

In witness whereof I, the said OBADIAH B. LATHAM, have hereunto set my hand.

OBADIAH BAILEY LATHAM.

Witnesses:

J. A. MALONEY,

CHARLES P. WEBSTER.